US008358613B1

(12) United States Patent
Giallorenzi et al.

(10) Patent No.: US 8,358,613 B1
(45) Date of Patent: Jan. 22, 2013

(54) TRANSMITTER-DIRECTED SECURITY FOR WIRELESS-COMMUNICATIONS

(75) Inventors: Tom Giallorenzi, Sandy, UT (US); Eric Hall, Sandy, UT (US); Osama Haddadin, Salt Lake City, UT (US); Dan Watt, West Jordan, UT (US); James Dyal, South Jordan, UT (US)

(73) Assignee: L-3 Communications Corp., Salt Lake City, UT (US)

( * ) Notice: Subject to any disclaimer, the term of this patent is extended or adjusted under 35 U.S.C. 154(b) by 1001 days.

(21) Appl. No.: 12/394,429

(22) Filed: Feb. 27, 2009

(51) Int. Cl.
*H04Q 7/00* (2006.01)
(52) U.S. Cl. .................................................. 370/328
(58) Field of Classification Search .................. None
See application file for complete search history.

(56) References Cited

U.S. PATENT DOCUMENTS

| 5,598,154 | A | 1/1997 | Wilson et al. | |
|---|---|---|---|---|
| 5,724,383 | A | 3/1998 | Gold et al. | |
| 5,751,761 | A | 5/1998 | Gilhousen | |
| 5,943,322 | A * | 8/1999 | Mayor et al. | 370/280 |
| 6,091,760 | A | 7/2000 | Giallorenzi | |
| 6,285,681 | B1 | 9/2001 | Kolze et al. | |
| 6,657,985 | B1 | 12/2003 | Park | |
| 6,781,960 | B1 * | 8/2004 | Charas | 370/255 |
| 6,807,154 | B1 | 10/2004 | Malmgren et al. | |
| 6,829,317 | B2 | 12/2004 | Mege et al. | |
| 6,879,561 | B1 | 4/2005 | Zhang et al. | |
| 6,999,432 | B2 | 2/2006 | Zhang et al. | |
| 7,027,484 | B1 | 4/2006 | Tiedemann, Jr. | |
| 7,200,154 | B1 | 4/2007 | Wu et al. | |
| 7,477,913 | B2 * | 1/2009 | Brown et al. | 455/522 |
| 7,962,161 | B1 * | 6/2011 | Giallorenzi et al. | 455/466 |
| 2002/0061006 | A1 * | 5/2002 | Soliman | 370/342 |
| 2002/0097703 | A1 | 7/2002 | Nieczyporowicz | |
| 2003/0099280 | A1 | 5/2003 | Kumar et al. | |
| 2004/0125788 | A1 | 7/2004 | Pietraski et al. | |
| 2004/0228267 | A1 | 11/2004 | Agrawal et al. | |
| 2005/0055579 | A1 * | 3/2005 | Kanda et al. | 713/201 |
| 2006/0045115 | A1 * | 3/2006 | Nix et al. | 370/432 |
| 2006/0223566 | A1 * | 10/2006 | Brown et al. | 455/522 |
| 2009/0121850 | A1 * | 5/2009 | Tanaka et al. | 340/426.24 |
| 2010/0144313 | A1 * | 6/2010 | Chun et al. | 455/410 |

OTHER PUBLICATIONS

Hubner, H., "Multiplex Systems Using Sums of Walsh Functions", 1971 Proceedings, Second Edition, pp. 180-181.
Davidson, I.A., "The Multiplexing of Telephone Signals by Walsh Functions", Applications of Walsh Functions, 1971 Proceedings, Second Edition, Eds. R.W. Zeek and A.E. Showalter, pp. 177-179.
Yao, Yingwei, et al., "A Two-Layer Spreading Code Scheme for Dual-Rate DS-CDMA Systems", IEEE Transactions on Communications, vol. 51, No. 6, Jun. 2003, pp. 873-879.
U.S. Appl. No. 11/351,370, filed Feb. 9, 2009, Harris.
Srivastava et al., "Using Game Theory to Analyze Wireless Ad Hoc Networks", Virginia Polytechnic Institute and State University, Blacksburg, Virginia, IEEE Commun. Surveys Tuts., vol. 7, No. 4, pp. 46-56, 2005.

(Continued)

*Primary Examiner* — Hassan Phillips
*Assistant Examiner* — Prenell Jones
(74) *Attorney, Agent, or Firm* — Kirton McConkie (57) ABSTRACT

Transmitter-directed transmission security is provided between a transmit node and a receive node. The transmit node selects transmission format for each data frame based on a transmission security scenario. Information related to the transmission format is communicated between the transmit node and the receive node, and the data frames are transmitted over a wireless communication link using the selected transmission formats.

29 Claims, 7 Drawing Sheets

OTHER PUBLICATIONS

Neel, "How Does Game Theory Apply to Radio Resource Management?", PhD dissertation, Virginia Tech, Jan. 2004.
U.S. Appl. No. 12/383,059, filed Mar. 18, 2009, Giallorenzi.
Srivastava et al., "Using Game Theory to Analyze Wireless Ad Hoc Networks", Virginia Polytechnic Institute and State University, Blacksburg, Virginia.
P. Venkitasubramaniam, Ting He and Lang Tong. "Relay Secrecy in Wireless Networks with Eavesdroppers". 44th Allerton Conference on Communication, Control and Computing, Sep. 2006.
Neel, "How Does Game Theory Apply to Radio Resource Management?", PhD dissertation, Virginia Tech.
U.S. Appl. No. 12/349,706, filed Jan. 7, 2009, Giallorenzi et al.

* cited by examiner

TRANSMITTER-DIRECTED SECURITY FOR WIRELESS-COMMUNICATIONS

FIELD OF THE INVENTION

The present application relates to wireless communications. More particularly, the present invention relates to transmission security in wireless communications systems.

BACKGROUND

Wireless communications is becoming increasingly important, with wireless systems finding their way into every growing numbers of applications. One consideration in wireless systems is security, and wireless systems can be vulnerable to eavesdroppers and intentional interferers (jammers). Protecting the information transmitted through wireless link is often an important consideration. Other aspects of a wireless communication link can also be important to protect from exploitation. For example, traffic analysis of a wireless communication network may help an adversary to determine what functions different nodes in a network are providing without requiring the adversary to actually decode the content of messages within the network. Radio emissions from a wireless communications link may be used to locate or home in on the node making the emissions. An adversary may also attempt to interfere with (jam) communications links.

In general, communications security (COMSEC) encompasses measures and controls taken to deny unauthorized persons information derived from telecommunications and to ensure the authenticity of such telecommunications. COMSEC can be broken into a number of differing, although overlapping, aspects: cryptosecurity, transmission security, emission security, traffic-flow security, and physical security. Cryptosecurity encompasses protecting the information that is communicated (e.g. data) and typically involves the use of cryptosystems to ensure message confidentiality and authenticity. Emission security (EMSEC) encompasses measures taken to deny unauthorized persons information of value, which might be derived from intercept and analysis of compromising emanations from crypto-equipment, automated information systems (computers), and telecommunications systems. For the purposes of the present discussion, we considered EMSEC to refer to unintentional emissions. In contrast, transmission security (TRANSEC) is the application of measures designed to protect intentional transmissions from interception and exploitation by means other than cryptanalysis. Finally, traffic-flow security includes measures that conceal the presence and properties of valid messages on a network. Finally, physical security encompasses physical measures taken to safeguard equipment, material, and documents from access thereto or observation thereof by unauthorized persons.

Turning to transmission security, TRANSEC has traditionally involved using spread spectrum techniques, such as frequency hopping and direct sequence. Benefits of spread spectrum include spreading the transmission energy over a wider bandwidth, making the signal harder to detect and jam. The frequency-hopping pattern or direct sequence code is typically derived using a pseudorandom sequence. On one hand, the pseudorandom sequence must usually be known by intended receivers to allow the intended receivers to synchronize to the signal. On the other hand, the pseudorandom sequence must be kept secret from would-be interceptors, or many of the benefits of spread spectrum are lost. Thus, traditional wireless networks using spread spectrum typically include a key distribution scheme to allow the spreading sequence keys to be distributed through the network. This key distribution can be cumbersome. Some system use predefined fixed keys to avoid the need for key distribution, but this can make the system vulnerable, as if the key is ever divulged the security is lost.

Another difficulty with spread spectrum systems is that synchronization can be difficult. In order for the receiver to detect the signal in frequency hopping systems, it is necessary for the receiver to frequency hop in synchronization with the transmitter. Thus, the receiver must synchronize to the timing of the transmitter, taking into account any differences in timing that are introduced by propagation delay between the transmitter and the receiver. In direct sequence systems, the receiver must generate a local spread sequence that is time synchronized with that of the transmitter to allow the spreading sequence to be removed. Many different schemes, including the use of external time synchronization sources, preamble sequences, and pilot channels have been developed to address this challenge. Nonetheless, the synchronization requirements often add considerable complexity to a spread spectrum system as compared to more conventional non-spread spectrum systems. Because of this complexity, spread spectrum systems typically use predefined chipping or hopping rates and thus cannot vary the spread spectrum encoding to adapt to varying requirements or changing conditions. Moreover, existing spread spectrum systems are typically designed to address one TRANSEC threat (e.g., jamming) and do not necessarily perform well when faced with a different type of TRANSEC threat (e.g., geolocation).

SUMMARY

It has been recognized that it would be advantageous to develop a transmission security technique that is transmitter-directed, wherein the transmission format for each transmitted data frame is selected by the transmitter according to a transmission security scenario.

Some embodiments of the invention include a method of transmitter-directed transmission security in a wireless communication link. The method can include accepting data for transmission from a data source. Data frames can be formed, and at least a portion of the data inserted into the data frames. A transmission format can be selected for each data frame based on a transmission security scenario. The transmission format for a data frame can be the same as a previous data frame, or the transmission format can change from the previous data frame. The method can also include transmitting format information that at least partially defines the transmission format of each data frame and transmitting data frames using the corresponding transmission format.

Some embodiments of the invention include a wireless transmission system providing transmitter-directed transmission security. The transmission system can include a framer having a data input and frame output and configured to form and output data frames using data received at the data input. A selector can be coupled to the framer and configured to select a corresponding transmission format for each data frame based on a transmission security scenario. A transmitter can be coupled to the framer and the selector. The transmitter can be configured to transmit format information into a wireless channel that at least partially defines the transmission format and to transmit the data frames into the wireless channel using the corresponding transmission format.

Some embodiments of the invention include a wireless reception system for use with transmitter-directed transmission security. The reception system can include a first receiver, a second receiver, and a decoder. The first receiver can be configured to receive format information at least partially defining the transmission format of data frame. The decoder is coupled to the first receiver and the second receiver and can be configured to use the format information to determine a frame format of the data frames. The second receiver can be configured to receive the data frames using the frame format determined by the decoder.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As mentioned above, a wireless communications system can have many different and somewhat contradictory transmission security requirements. For example, a military communication scenario can include a wireless communication network where some nodes are behind enemy lines (and thus a low probability of detection or geolocation is highly desirable) while other nodes carry critical real-time sensor information (and thus a low probability of jamming is desirable). It is difficult to design a waveform that can simultaneously satisfy all of these desires without the resulting waveform being a poor compromise for one or more of the requirements.

Accordingly, a waveform that allows the transmission security to be changed on a dynamic basis has been developed. Transmission security can, for example, include known techniques such as frequency hopping and direct sequence spreading. Transmission security can also include not previously known techniques, such as permutation of modulation format, permutation of coding format, permutation of frequency hop tables, permutation of direct sequence pattern, and permutation of other transmitter parameters. On a packet-by-packet basis, the transmission security techniques applied to the transmission can be varied. Thus, some packets can be transmitted using different transmission security techniques than other packets. For example, and not by way of limitation, one packet can include frequency hopping, while a later packet can include direct sequence. As another non-limiting example, one packet can use a first modulation format and a later packet can use a second modulation format. The transmission security techniques can be varied as a function of time, as a function of mission requirements at a particular time, based on source and destination of the packet (e.g., data requirements), and other factors (e.g., identified threats or wireless channel characteristics). Any one, more than one, or all of these considerations can form a basis for selecting the transmission security format in various embodiments.

The wireless communications network can include communications nodes that are capable of operating in a number of different transmission security modes, and these nodes can switch mode on the fly as needed. Because the transmission security techniques can change on the fly, the transmission security mode being used can be communicated from the transmitter to the intended receiver. This communication can, for example, occur through the wireless link. Providing for transmitter-directed communications security is a significant departure from traditional fixed-format transmission security schemes, where the transmitter has been constrained to use a predefined and fixed transmission security mode.

Figure 1:
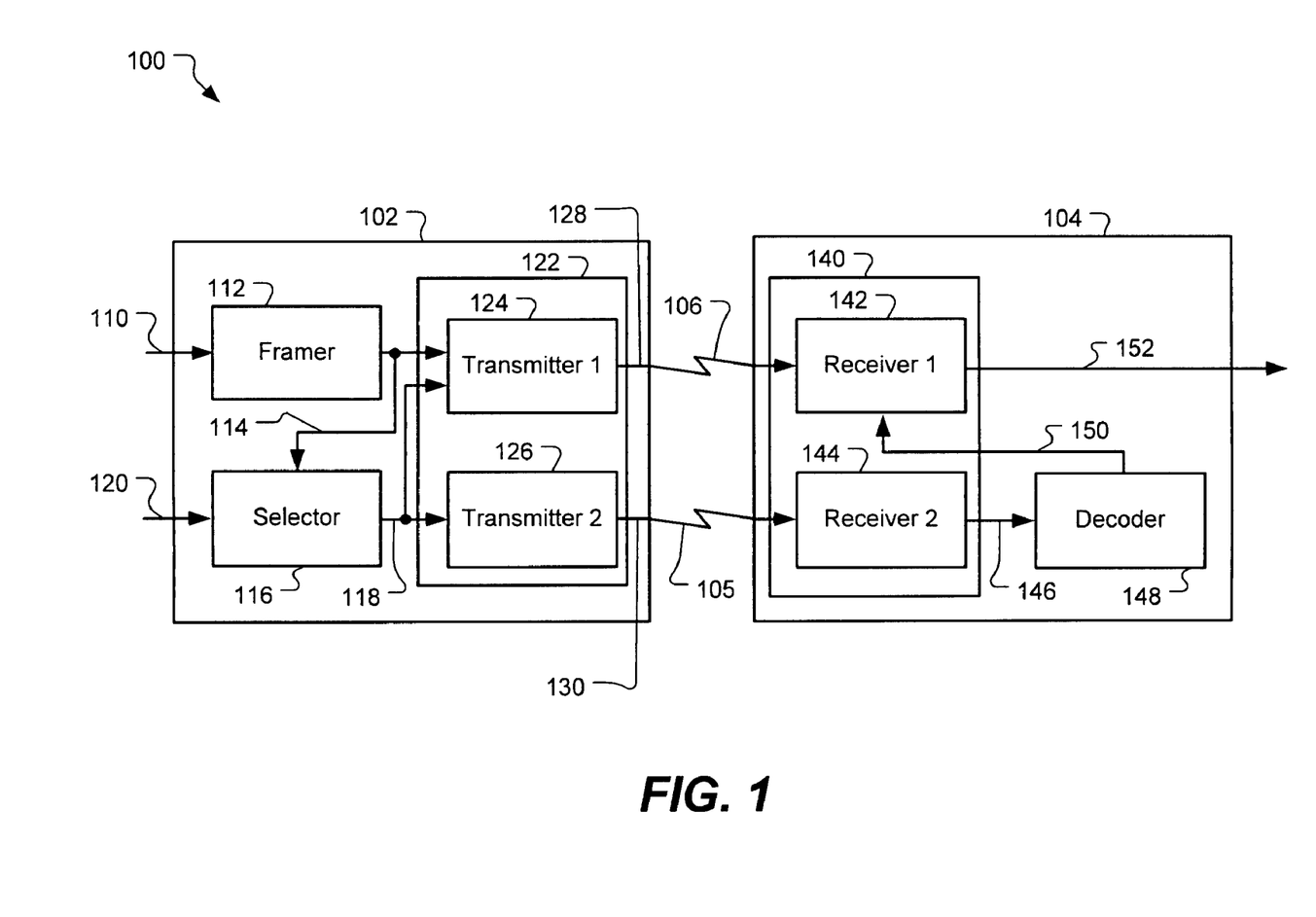
FIG. 1 is a block diagram of a wireless communication system in accordance with some embodiments of the present invention.

FIG. 1 illustrates a block diagram of a wireless communication system in accordance with some embodiments of the present invention. The system 100 can include a transmit node 102 and a receive node 104 which communicate through a wireless channel 106. The transmit node can accept input data 110 which is provided to a framer 112. The framer can form data frames 114 from the input data. For example, a continuous data stream can be broken into individual packets for transmission. As another example, input data can already be in a packet form, and one or more individual packets can be placed into a data frame. Resulting data frames can be variable in length, in that the length of data frames can differ from each other.

A selector 116 can be coupled to the framer and select a transmission format 118 for each data frame based on a transmission security scenario. For example, the transmission security scenario can be defined by or take into account input parameters 120 provided to the transmit node 102. As another example, the transmission scenario can be preprogrammed into the transmit node 102. The transmission security scenario can, for example, include rules as to how transmission frequency, spreading sequences or codes, modulation formats, data rates, and other transmission parameters are selected.

A transmission security scenario can be relatively simple or can be quite complex. For example, a simple transmission security scenario can include randomly varying transmission format parameters on a periodic basis. A more complex transmission security scenario can include a number of rules that are applied to defined different actions to be taken as a function of the current operating conditions. For example, a rule can define that, when jamming is present, use of a difficult to jam waveform, such as wide bandwidth frequency hopping is applied. Thus, an input to the selector 120 can include information relating to the jamming environment, allowing the selector to switch into a frequency-hopping mode when jamming is present. As another example rule, when a low probability of detection is required, transmission power can be minimized and highly power efficient modulation formats used to help minimize radiated power. As yet another example rule, when minimal transmission security requirements are present, the selector can switch into high-throughput or high-bandwidth efficiency modulation modes to help enhance overall network performance. A transmission security scenario can include rules regarding when transmission parameters are randomly varied, when they are held constant, and even when random number generators are reset. As a specific example, frequency hopping can initially use a first hop interval and first random number generator seed. If jamming is detected, frequency hopping can switch to a second hop interval and a second random number generator seed. As another example, frequency hopping can change the frequency-hopping pattern (e.g., the formula or table used to translate a pseudo random number into a frequency).

The rules comprising a transmission security scenario can be predefined, allowing for inputs from the transmitter (e.g., describing characteristics of the data to be transmitted), inputs from an intended receiver (e.g., through a feedback channel describing characteristics of the wireless channel, threat environment etc.), and other inputs to select a particular transmission security scenario. Additional details regarding transmission security scenarios will become more apparent from the discussion further below.

The transmit node 102 can also include a transmitter subsystem 122 coupled to the framer 112 and to the selector 116. The transmitter subsystem can, for example, include a first transmitter 124 and a second transmitter 126. The first transmitter can accept the data frames 114 and transmit formatted data frames 128 into the wireless channel 106 using the corresponding transmission formats 118 selected for the data frames by the selector 116. The second transmitter can communicate format information 130 to the receive node 104, wherein the format information at least partially defines the transmission format 118. For example, the format information can be transmitted via a wireless channel 105 (which can be the same or different wireless link 106), or via some other communications means. For example, the format information can be communicated via a satellite broadcast link while the data frames can be communicated via point-to-point radio frequency links. As an alternate example, the wireless links 105, 106 can be similar in frequency range and both operate point-to-point between the transmit node and receive node. Although the transmit subsystem is shown having two separate transmitters, depending on the characteristics of the communications channels, the transmit subsystem can, in some embodiments, contain a single transmitter which is used to transmit both the formatted data frames and the format information.

Turning to the details of the receive node 104, the receive node can include a receiver subsystem 140. The receiver subsystem can include a first receiver 142 and a second receiver 144. The second receiver can receive the format information 130 from the transmit node 102, and pass the received format information 146 to a decoder 148. The decoder can determine frame formats 150, and pass this frame format to the first receiver, which can receive data frames 130 using the frame format. The received data frames 152 can be output from the receive node. Although the receiver subsystem is shown as including two receivers, in some embodiments, a single receiver can be used for receiving both the format information and the data frames.

It will be appreciated that the wireless channel can be variable and hostile, and not every transmission of format information and data frame from the transmit node 102 is necessarily correctly received at the receive node 104. Of course, when format information for a particular data frame is not correctly received and decoded by the second receiver 144, it is difficult for the first receiver 142 to correctly receive that particular data frame. Conversely, even when the format information is correctly received and decoded by the second receiver, the data frame may be incorrectly received by the first receiver due to errors. Error control and other techniques for mitigating the impact of these types of situations can be applied and is discussed further below.

Various detailed examples of varying transmission parameters in accordance with a transmission security scenario will now be illustrated, although these examples are for illustration only and the operation of the system and method is not limited to these particular examples.

Figure 2:
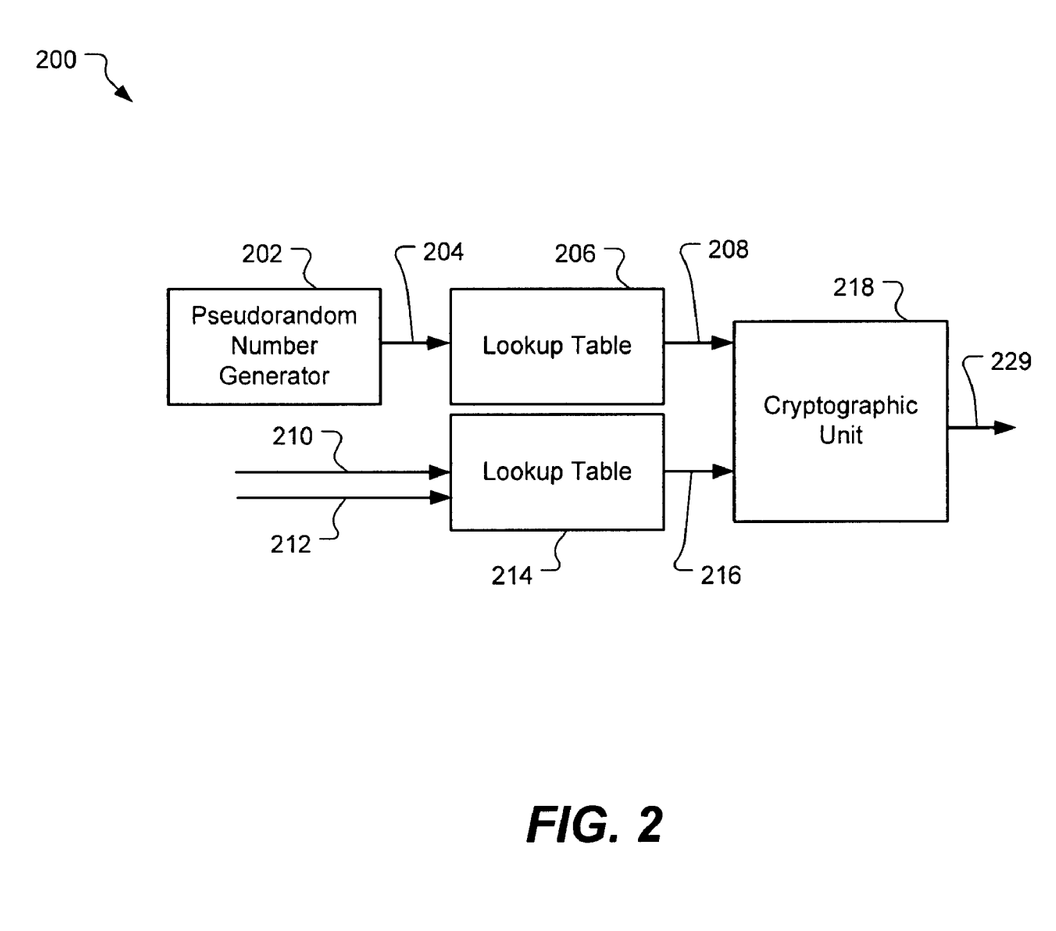
FIG. 2 is a block diagram of a selector in accordance with some embodiments of the invention.

In some embodiments, the transmission security scenario can include varying some transmission format parameters based on the data, varying some transmission format parameters based on a random number generator, and combinations thereof. For example, FIG. 2 illustrates one embodiment of a selector 200, which can be used in the system of FIG. 1. The selector 200 provides the ability to vary the transmission format in part randomly and in part based on data. The selector can include a pseudorandom number generator 202. The generator can generate a random number 204, which can be pseudorandom in that it is predictable given some secret information (e.g., a starting seed). For example, pseudorandom number generators can include linear feedback shift registers, congruential multipliers, and similar techniques. While generally more complex, a true random number generator can also be used if available.

The random number 204 can be used to select one or more parameters of the transmission format. As a specific example, the transmission frequency, transmission phase, transmission amplitude, an applied spreading sequence, a set of frequency hop frequencies, a mapping table for converting a pseudo random number to a frequency hop frequency, a modulation format, a data frame length, or a combination of any one or more of these parameters can be determined based on the random number. As another example, the random number can be used to determine which of several transmission format parameters is changed. For example, for one frame, the modulation format can be changed, for the next frame the coding format can be changed, for the next frame the transmission frequency can be changed, etc. As a specific example, for each frame, a first random number can be used to pick which parameter is changed from the previous frame, and a second random number can be used to pick the value for the parameter being changed. Of course, the random number need not be used directly, but can be used as an index into a lookup table 206 to select the parameters or values for parameters 208. For example, for a transmitter which can operate in any of six different modulation modes, a random integer uniformly distributed between one and six can be generated each frame to select which of the six modulation modes is used during the current or a subsequent frame. In other words, the random number can be used to permute various parameters of the transmission format to provide modulation permutation, coding permutation, hoping pattern permutation, spreading pattern permutation, and the like.

The transmission security scenario can also take into account aspects of the input data 210 to be transmitted. For example, the transmission format can be selected in part based on content of the data or additional data characteristics 212 associated with the data and provided separately. For example, data can include headers defining source and destination, data type, quality of service requirements, and similar parameters that can be translated into a second set of transmission parameters 216 by a second lookup table 214. Data characteristics 212 can alternately be specified to the selector 200 by a separate interface, for example, an interface to a link control processor (not shown) or similar entity. If desired, the transmission security scenario can include varying the operation of the random selection of parameters based on the data type. For example, for high rate data, operation may be possible in either of two modulation modes, while for low rate data, operation may be in any of six modulation modes, and thus the selection of modulation mode can be a random selection within the allowable set of modulation modes for the particular data.

The selector 200 can also include a cryptographic unit 218 to allow encryption of the transmission parameters 208, 216. The encrypted format information 229 can be communicated to the intended receiver, helping to make it difficult for an adversary to exploit the format information. The transmission parameters can be used to configure the transmitter used to transmit the data frames.

Figure 3:
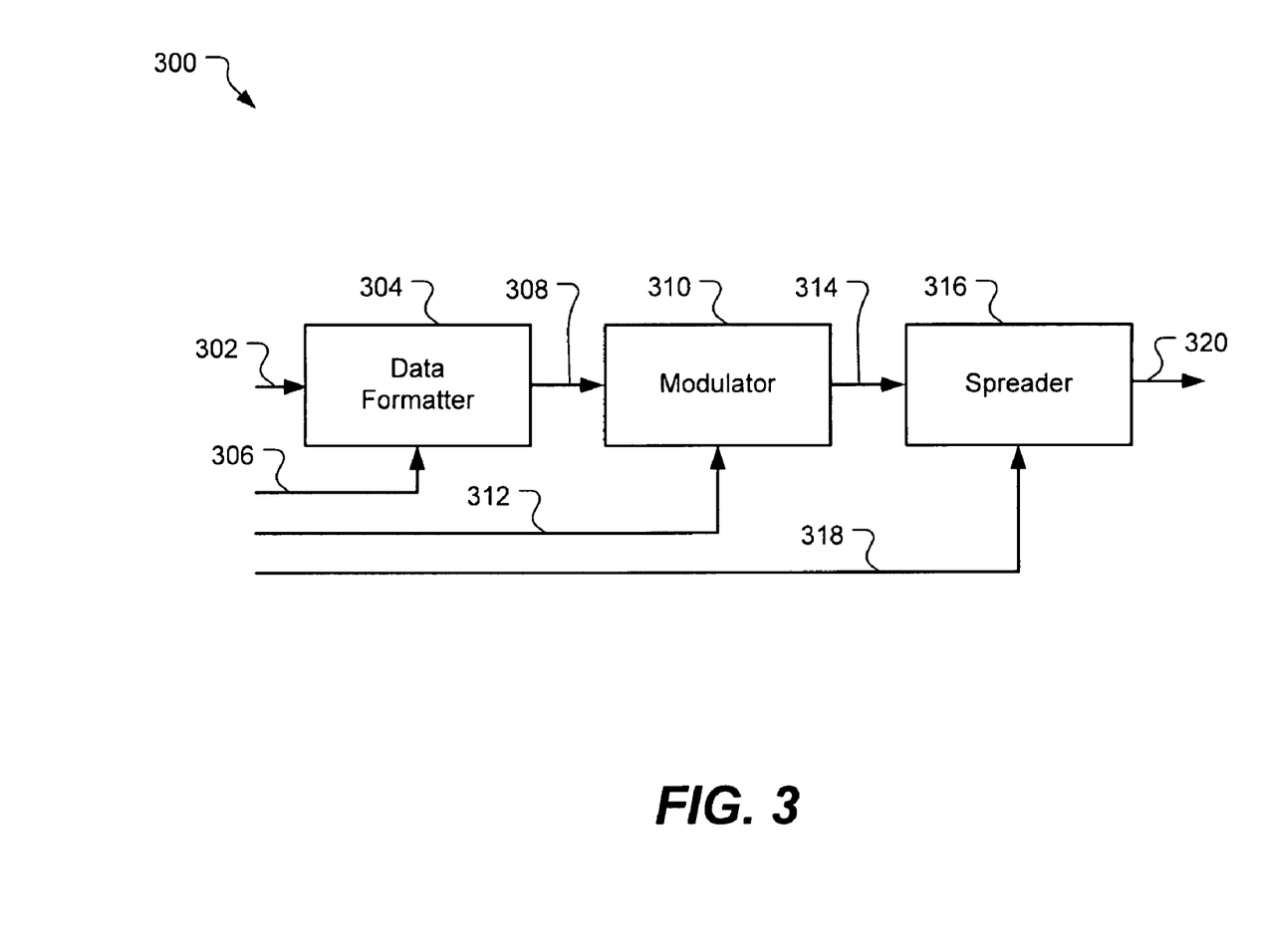
FIG. 3 is a block diagram of a transmitter in accordance with some embodiments of the invention.

For illustration purposes, FIG. 3 illustrates one embodiment of a transmitter 300, which can be used to communicate format information to a receiver. This illustration is merely to provide additional explanation of how a transmission security scenario can be implemented in some embodiments, as many other arrangements of a transmitter can also be used. Data frames 302 can be provided to a data formatter 304, which can place the data into the proper format for the chosen modulation mode. For example, the modulation mode can use binary, quadrature, octal, or other types of symbols. If desired, forward error correction encoding can also be performed by the data formatter. For example, forward error correction can include convolutional coding, block coding, turbo coding, interleaving, and similar functions. Accordingly, the data formatter can be provided some of the transmit format parameters 306, which are used to define the modulation mode, forward error correction coding, or both.

The formatted transmit data 308 can be provided to a modulator 310 which can modulate the data. The modulator can thus be provided some of the transmission format parameters 312 to allow selection of the modulation type. For example, modulation type can include phase shift keying, amplitude keying, combinations of phase and amplitude (e.g., quadrature amplitude modulation), frequency shift keying, and the like. The modulated signal 314 can be passed to a spreader 316. The spreader can include, for example, a frequency hopper, a direct sequence spreader, or both. The spreader can also be provided transmit format parameters 318, such as frequency sequence, frequency-hopping code, direct sequence spreading code, and/or spreading sequence, each of which can vary from frame to frame. The spread signal 320 formed by the spreader can be transmitted via the wireless channel. The transmitter can also include upconverters, mixers, filtering, frequency references, frequency synthesizers, antennas, and other known elements and therefore further discussion of these components is not necessary. The functions of the data formatter, modulator, and spreader need not be separated as shown here, and part or all of the functionality of these units can be combined in various implementations. For example, implementations of the various elements defined herein can include digital hardware (e.g., field programmable gate arrays, application specific integrated circuits), computer executable instructions used to control operation of specialized and/or general-purpose processors, analog components, and other known electronic devices.

Various ways of communicating the format information from the transmitter to the receiver can be used. In some embodiments, the format information can be transmitted on a first channel of the wireless communication link, and the data frames can be transmitted on a second channel of the wireless communication link. Channels can be defined using frequency division multiplexing, time division multiplexing, code division multiplexing, or combinations thereof.

Figure 4:
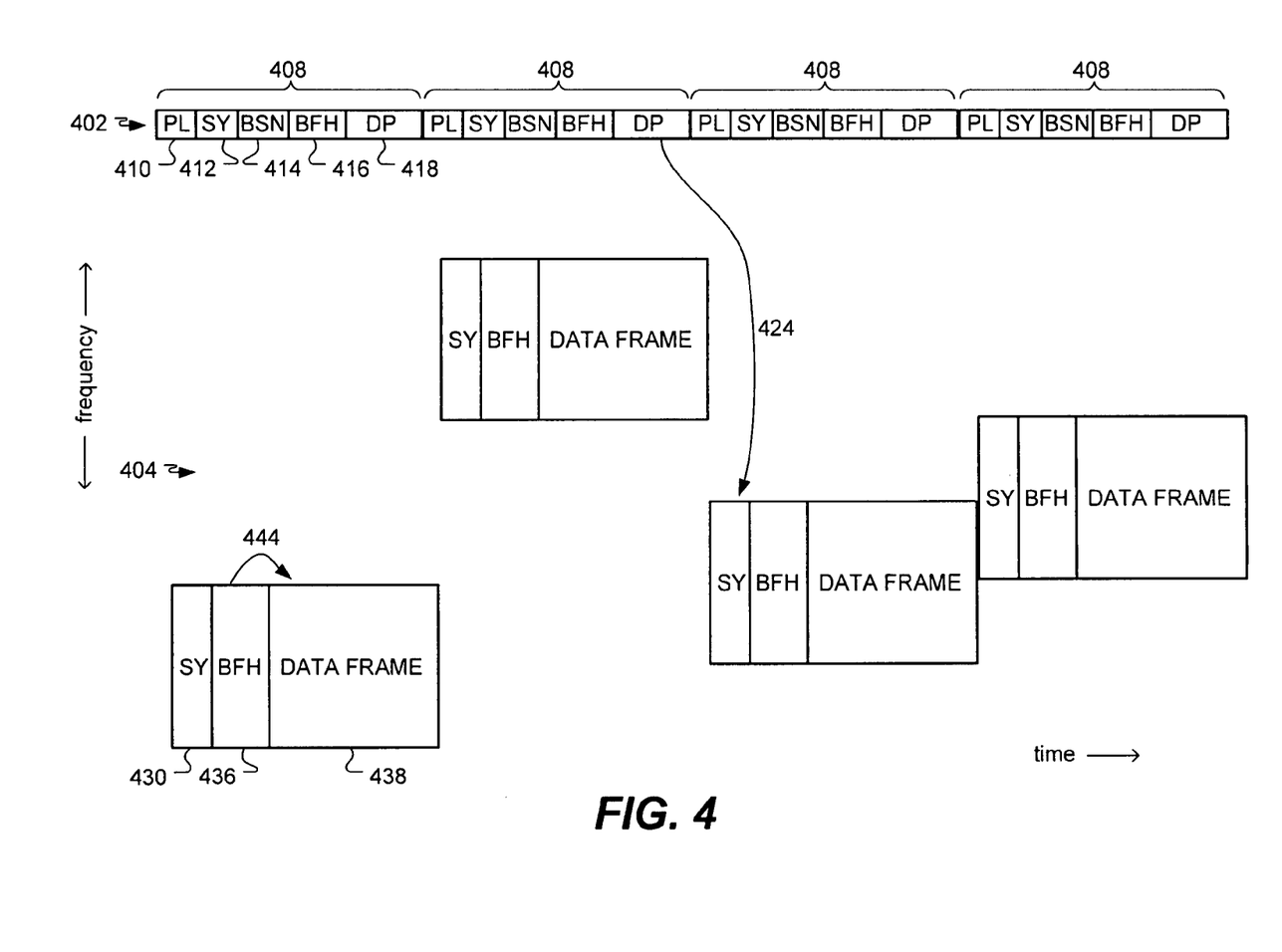
FIG. 4 is a time-frequency illustration of transmissions between a transmit node and a receive node in accordance with some embodiments of the invention.

FIG. 4 illustrates a time-frequency illustration of transmissions between a transmit node and a receive node in accordance with some embodiments of the invention. A discovery channel 402 can be transmitted on the first frequency channel and define the format information used for transmission of a traffic channel 404 on the second frequency channel. The discovery channel can also include additional information to facilitate discovery and entry into a wireless communications network by authorized nodes. The discovery channel can include a number of different fields within individual discovery frames 408. A preamble 410 field can include a known data pattern (and, if desired, a known spreading sequence) which aids a receiver in detecting and locking onto the discovery channel. A synchronization 412 field can mark the end of the preamble and the beginning of the payload portion of the frame. A burst sequence number 414 can uniquely identify the burst number, and can be useful for various purposes. A burst format header 416 can define the transmission format of the discovery payload 418. The discovery payload can provide information used by an authorized receiver to lock onto the traffic channel quickly. The discovery payload can, for example, include any or all of the following format information:

current time information
start time of next burst on traffic channel
pseudorandom number initialization data
encrypter/decrypter initialization data
frequency of traffic channel
traffic channel modulation type
traffic channel modulation rate
traffic channel coding and interleaving type
traffic channel synchronization pattern
frequency hopping pattern
direct sequence pattern The discovery payload 418 can include format information pointing 424 to one or more frames 438 in the future on the traffic channel, for example to allow the receiver time to decode the discovery payload before applying the information in reception of the traffic channel. The discovery payload can also include error correction coding to enhance the robustness of the various fields. For example, individual fields of the discovery payload can be block coded. As another example, all or part of the discovery payload can be convolutionally coded. Other combinations of coding, including concatenated codes, turbo codes, and the like can also be applied.

The traffic channel 404 can also include a synchronization field 430 used for similar purposes as the discovery channel 402. Note, however, that the synchronization field of the traffic channel can be shorter than the discovery channel, since the discovery channel can provide information that aids the receiver in locking onto the traffic channel. In some situations, it can be possible to entirely omit the synchronization field from the traffic channel. If desired, the synchronization pattern can vary from frame to frame (in which case, the synchronization pattern is one of the format parameters communicated from the transmitter to the receiver). The synchronization field can be used for equalizer training, phase ambiguity resolution, and similar purposes.

The traffic channel 404 can also include a burst format header 436, which can define the format for the data frames 438, and can include information similar to the information described above for the discovery payload. The burst format header can provide format information corresponding 444 to the immediately following data frame, or for one or more data frames in the future.

Note that the format information for the data frame 438 can be defined by the discovery payload 418, the burst format header 436 of the traffic channel, or by combinations of the two. Accordingly, if desired, the format information of the data frame can be specified entirely by the discovery payload and the burst format header of the traffic channel can be omitted. Alternatively, if desired, the format information of the data frame can be specified entirely by the burst format header of the traffic channel and the discovery payload can be omitted. As another example, portions of the information can be defined by each, so that both fields are used to determine the format information for data frames. Finally, as yet another example, portions of the format information can be defined by one or the other, and other portions of the format information can be defined by other means (e.g., predefined and known to the transmit node and receive node, or communicated in some way outside the wireless system).

As mentioned above, one of the transmission security aspects can include frequency hopping of the traffic channel 404. Accordingly, it can be seen in FIG. 4 that each burst on the traffic channel 404 can be transmitted using a different center frequency. Thus, one of the pieces of format information included in the discovery payload 418 can be the frequency of the next traffic channel burst. In such a case, the receive node can include a first receiver operating on the discovery channel frequency, and a second receiver operating on the (varying) traffic channel frequency. As another example, frequency hopping can occur at a faster rate on the traffic channel so that multiple frequency changes occur during each burst transmission. As yet another example, frequency hopping can occur irregularly, with a variable number bursts transmitted on one frequency, and then hopping to a new frequency.

Generally, the amount of information used in the discovery payload 418 to describe the traffic channel format can be much smaller that the amount of information contained in the corresponding data frame 438. Thus, the discovery channel can use a much smaller amount of bandwidth than the traffic channel. For example, the ratio of information data rate of the traffic channel to the discovery channel can be greater than 100:1, greater than 1000:1, or even higher. The lower information rate of the discovery channel can be used advantageously in several ways to enhance the security of the system. For example, the discovery channel can use spread spectrum techniques with high processing gain (high ratio of transmission bandwidth to information rate achieved through spreading, coding, or combinations thereof). High processing gain can help to increase the jam resistance, reduce the detectability, and increase the resistance to eavesdropping. As mentioned above, the discovery channel can include encryption. For example, the burst sequence number 414, burst format header 416 and discovery payload 418 can all be encrypted, making it difficult for an adversary to monitor or spoof the discovery channel. As another example, the discovery channel can use steganography techniques. In general, steganography involves hiding a small message within a larger message in such a way that it is difficult for those other than the intended recipient to discern the presence of the small message. For example, a steganographically-hidden signal can be embedded or piggybacked onto a carrying signal that simulates the appearance of a normal signal that would not arouse suspicion. For example, the carrying signal can be a modified or simulated cell phone signal, a wireless internet signal, a radio broadcast signal, a radar signal etc. The discovery bursts can be hidden within the carrier signal in various ways. For example, discovery bursts can be hidden in the least significant bits of digitized voice (real or simulated) data. As another example, the discovery bursts can be hidden in the least significant bits of image data. As another example, the discovery bursts can be hidden in noise-like signals that are added to the transmitted signal (e.g., apparent phase noise or phase jitter, frequency variations, additive noise, etc.). Steganographic hiding can be particularly useful for some transmit node types that are "noisy" in that they have high amounts of wireless transmissions and do not attempt to maintain a low probability of detection.

It will be appreciated that inevitable errors which occur on the wireless channel due to noise, fading, or interference can disrupt communications and potentially result in loss of synchronization between a transmit node and receive node if not managed. Accordingly, the use of error correction coding on the various fields of the discovery channel 402 and traffic channel 404 can help to reduce the impact of inevitable errors. Additional redundancy can be included by including information about more than one data frame in the burst format headers 416, 436 and discovery payload 418. Information about one data frame can be partially communicated in each of two different discovery payloads. As a particular example, where the data frame length can vary from frame to frame, the discovery payload can communicate the data frame length and modulation format in one burst, and communicate the start time of the data frame in a different burst. Thus, as long as one of the two bursts is received, it is possible to keep track of where the data frame bursts begin on the traffic channel.

At this point, it should be appreciated that the transmitter-direction transmission security techniques described herein can provide a high degree of flexibility. Because the transmission format can be changed every frame, this provides additional degrees of freedom that can be used for randomization of the signal format. This increased randomization provides additional security, since an adversary must generally search all of the different signal formats when attempting to detect the signal. On the other hand, implementation of an intended receiver is simplified, since the need for clock and code synchronization is greatly reduced. The transmitter can unilaterally generate a pseudorandom number sequence to drive the transmission format, and the receiver can simply follow along using the burst format information provided by the transmitter. In contrast, in conventional pseudorandom-number-driven spread spectrum systems the transmitter and receiver each contain pseudorandom number generators that must generally be properly synchronized.

An additional benefit of transmitter-direction transmission security is the potential elimination of separate transmissions security keys from the system. Conventional communications systems often include both COMSEC keys for use in data encryption and TRANSEC keys for use in transmission security (e.g., used to determine the frequency-hopping pattern). Different handling and storage requirements are placed on these different keys, making for complex system designs. In contrast, some embodiments of the present invention can eliminate the use of TRANSEC keys, relying on the COMSEC keys only, potentially simplifying the overall system design.

Transmitter-directed transmission security can be particularly beneficial in a point to multipoint system where one transmit node communicates with multiple receive nodes. In point to multipoint systems, many receive nodes can simultaneously receive the discovery channel, and the overhead cost of the discovery channel can be shared throughout the entire network. The techniques can also be applied to bidirectional links and mesh networks as well. Accordingly, some embodiments of the present invention can be operated in point-to-point, hub-spoke, full mesh, partial mesh, and hybrid networks.

Figure 5:
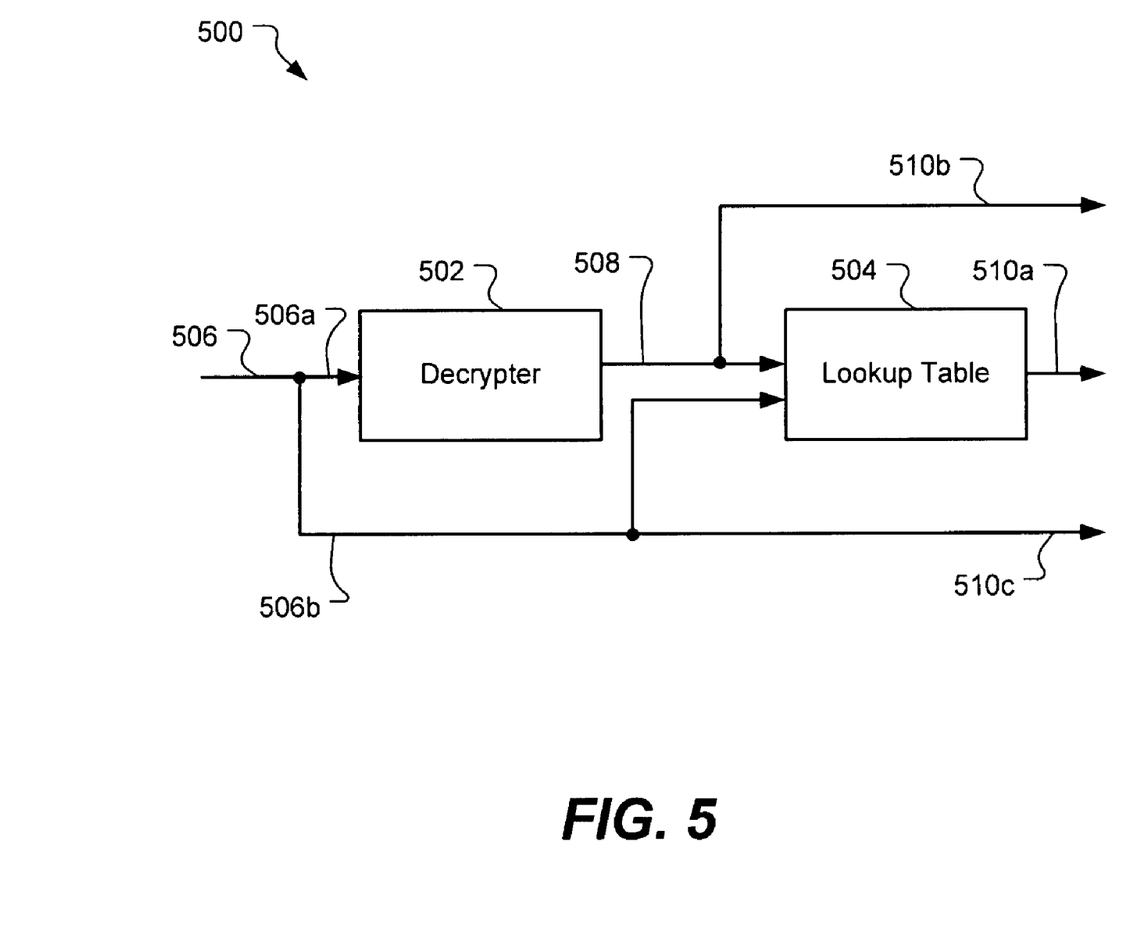
FIG. 5 is a block diagram of a decoder in accordance with some embodiments of the invention.

Returning to the discussion of the receive node 104 (FIG. 1), one embodiment of a decoder 148 will now be discussed in conjunction with FIG. 5. The decoder 500 is compatible with the selector illustrated in FIG. 2. Format information 506 can be received over the wireless channel and can be received encrypted or unencrypted. Encrypted format information 506*a* can be provided to the decrypter 502, which decrypts it to provide decrypted format information 508. Decrypted format information and unencrypted format information 506*b* can be provided to the lookup table 504 to provide receiver parameters 510*a*. Alternately, or in addition, decrypted format information can be used directly to provide receiver parameters 510*b* and unencrypted format information can be used directly to provide receiver parameters 510*c*. In other words, the format information can be encrypted or unencrypted, and used directly or through a lookup table, to determine receiver parameters. The lookup table can allow the format information to partially specify the transmission format, wherein the remaining specification of the transmission format is determined by the predefined lookup table. A decoder need not include all of these components, for example, if no encryption is used, then the decrypter can be omitted. As another example, if translations using a lookup table are used, then the lookup table can be omitted.

Figure 6:
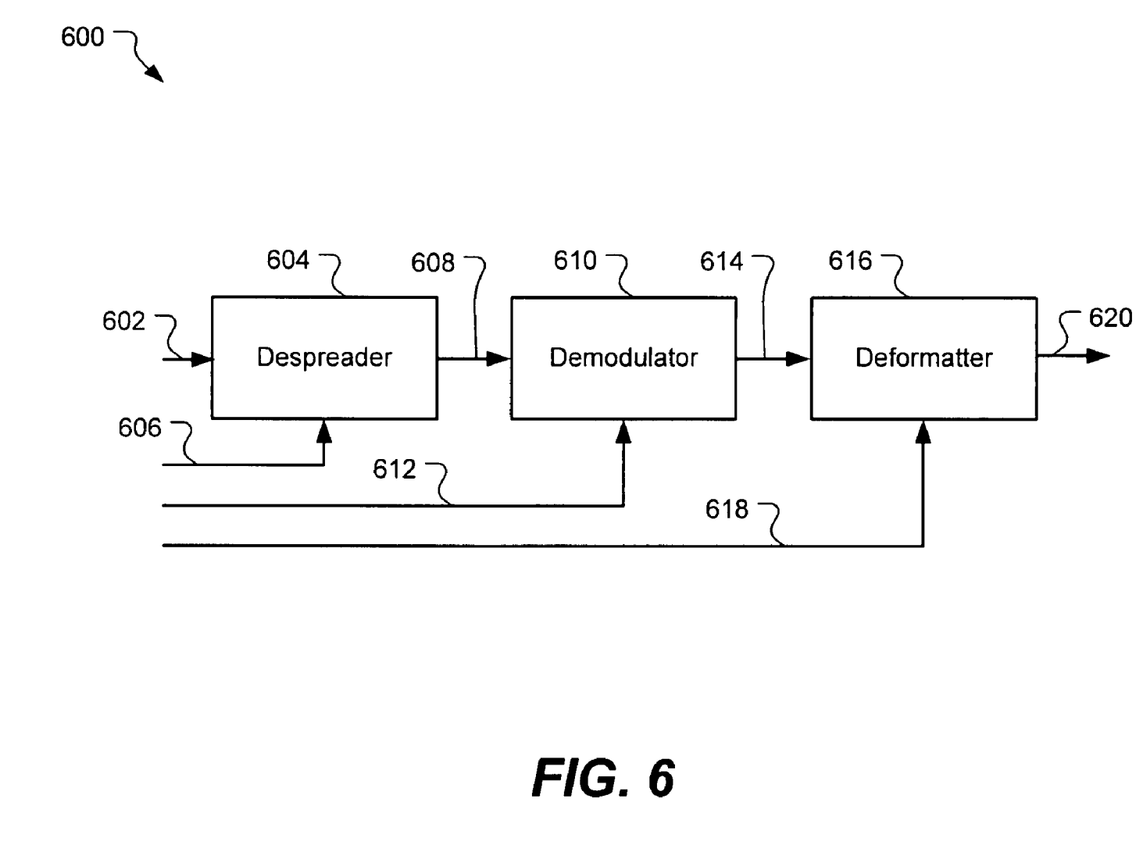
FIG. 6 is a block diagram of a first receiver in accordance with some embodiments of the invention.

Turning to FIG. 6, a detailed example of one embodiment of a first receiver is illustrated. This illustration is merely to provide additional explanation of how a transmission security scenario can be implemented in some embodiments, as many other arrangements of a receiver can also be used. The receiver 600 can receive data frames 602 over the wireless link, which can be dehopped or despread (if necessary) in despreader 604. For example, the data frames can be transmitted unspread, transmitted with direct sequence spreading, or transmitted with frequency hop spreading. The despreader can be provided format parameters 606 from the decoder, such as frequency, code sequence, etc.

The despread signal 608 can be passed to a demodulator 610, which can demodulate the data. The demodulator can be provided format parameters 612, such as modulation type (e.g. phase shift keying, amplitude keying, combinations of phase and amplitude, etc.).

Demodulated data 614 can be passed to the deformatter 616, which can reconstruct the data 620. The deformatter can use format parameters 618 that define the format for the chosen modulation mode. If desired, forward error correction decoding can also be performed by the deformatter. For example, the deformatter can include a turbo decoder, convolutional decoder, block decoder, or the like. The receiver can also include downconverters, mixers, filtering, frequency references, frequency synthesizers, antennas, and other known elements and therefore further discussion of these components is not necessary. The functions of the despreader, demodulator, and deformatter need not be separated as shown here, and part or all of the functionality of these units can be combined in some implementations.

Although not shown in the above diagrams, a communication system can include bidirectional links. Accordingly, a transmitter using transmitter-directed transmission security in transmission to a receiver can include a feedback path from the receiver to the transmitter. For example, the transmitter can have an associated receiver (or be part of a transceiver), and the receiver can have an associated transmitter (or be part of a transceiver). Accordingly, the feedback path from the receiver to the transmitter can be used to communicate information from the receiver back to the transmitter. For example, information related to threats and wireless channel conditions can be communicated from the receiver to the transmitter and used as an input into the transmission security scenario as described above.

Figure 7:
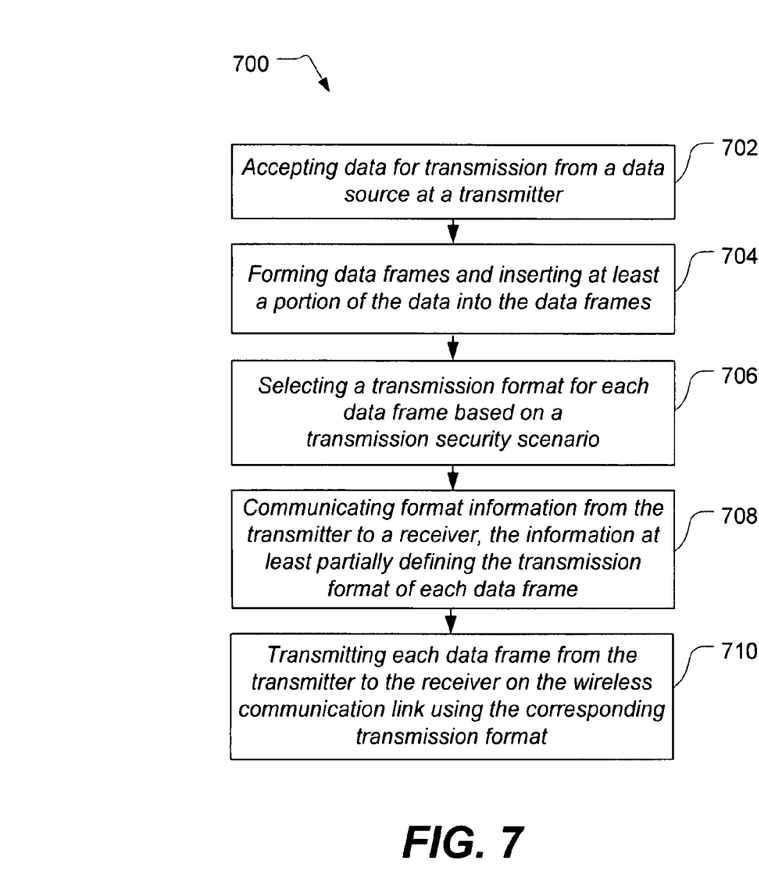
FIG. 7 is a flow chart of a method of transmitter-directed transmission security in a wireless communication link in accordance with some embodiments of the invention.

A flow chart for a method of transmitter-directed transmission security in a wireless communication link is illustrated in FIG. 7. The method 700 can include accepting 702 data from a data source at a transmit node. The method can also include forming 704 data frames and inserting at least a portion of the data into the data frames. For example, data can be split into multiple data frames as described above. As another example, data can come in the form of packets, and the packets can be split into multiple frames or multiple packets can be combined into a single frame. For each data frame, the method can include selecting 706 a transmission format for the data frame based on a transmission security scenario. Various transmission security scenarios are described above. For example, the transmission format can be selected randomly, based on the data content of the data frame, based on the data type or other requirements associated with the data (e.g., quality of service), based on source or destination of the data, based on channel conditions or threat assessments, or a combination thereof.

The method can also include transmitting 708 format information from the transmit node to a receive node via the wireless communication link. The format information can define the transmission format of each frame. For example, the format information can specify the frequency, spreading sequence, frame length, modulation format, modulation type, and similar parameters of the transmitted radio frequency signal. Any of the format information can vary from frame to frame. If desired, the format information can be encrypted, for example as described above. If desired, the format information can be transmitted in the form of parameters that partially define the transmission format, as remaining parameters can be fixed, communicated to the receiver by other means, or have a predefined relationship to the transmitted format information (e.g. through a lookup table).

The method can also include transmitting 710 each data frame from the transmit node to the receive node via the wireless communication link using the corresponding transmission format. For example, as described above, separate receivers can be used to receive the format information and to receive the data frames. The format information and data frames can be transmitted on the same wireless channel or on different wireless channels, for example as described above.

Figure 8:
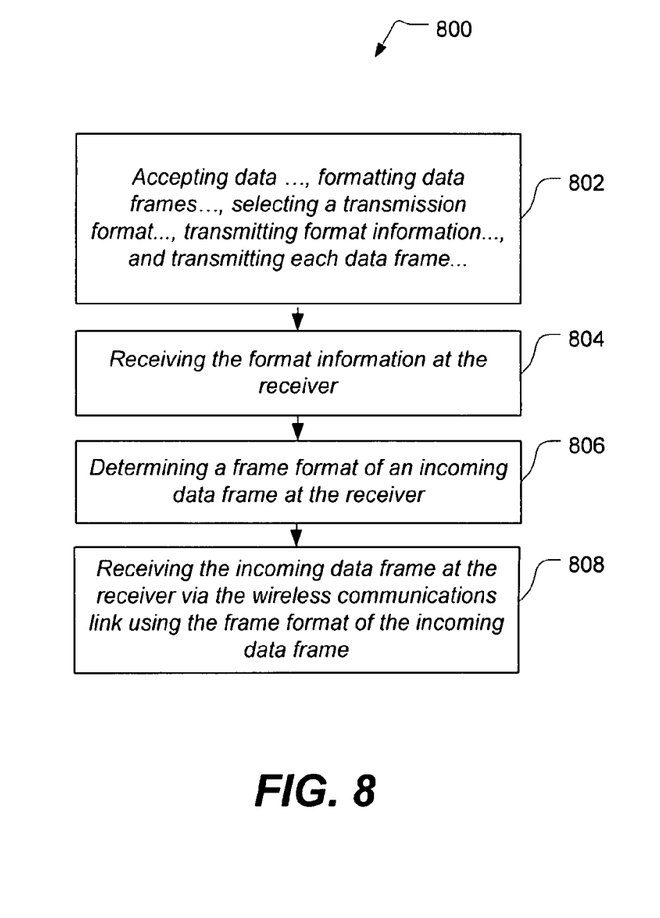
FIG. 8 is a flow chart of another method of transmitter-directed transmission security in accordance with some embodiments of the present invention.

Another method of transmitter-directed transmission security for a wireless communication link is shown in FIG. 8. The method 800 can include the operations 702, 704, 706, 708 as discussed above for FIG. 7 and thus are represented by block 802. The method can also include receiving 804 the format information at the receive node, determining 806 a frame format of an incoming data frame at the receive node, and receiving 808 the incoming data frame at the receive node using the frame format of the incoming data frame. For example, receiving the format information and receiving the incoming data frame can be performed using different receivers as described above. Determining the frame format can include decrypting the format information when the format information has been encrypted by the transmit node.

Summarizing and reiterating to some extent, a technique for transmitter-directed transmission security has been developed. Selection of transmission modes (e.g., modulation rates and format, spreading mode, spreading rates, spreading codes, etc.) can be made at a transmitter and communicated to a receiver, rather than relying on shared information (e.g. synchronized pseudo-noise generators at each of the transmitter and receiver). This can simplify key distribution within a communication network, while providing advantages in increasing the flexibility of the transmission security scheme. Transmission security modes can be changed during operation to adapt to changing wireless conditions, changing security requirements, changing security threats, and other factors.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

The invention claimed is:

1. A method of transmitter-directed transmission security in a wireless communication link, the method comprising:
accepting data for transmission from a data source at a transmitter;
forming data frames and inserting at least a portion of the data into the data frames;
selecting a transmission format for each data frame based on a transmission security scenario, wherein the transmission format changes between at least one pair of data frames;
communicating format information from the transmitter to a receiver, the information at least partially defining the transmission format of each data frame; and
transmitting each data frame from the transmitter to the receiver on the wireless communication link using the corresponding transmission format.

2. The method of claim 1, wherein the transmission scenario comprises varying a transmission frequency from data frame to data frame.

3. The method of claim 1, wherein the transmission scenario comprises varying a direct sequence spreading sequence from data frame to data frame.

4. The method of claim 1, wherein the transmission scenario comprises varying a frequency-hopping pattern from data frame to data frame.

5. The method of claim 1, wherein the transmission scenario comprises varying a frame length from data frame to data frame.

6. The method of claim 1, wherein the transmission scenario comprises varying a modulation format from data frame to data frame.

7. The method of claim 1, wherein the transmission scenario comprises selecting the transmission format based in part on the data within the data frame.

8. The method of claim 1, wherein the transmission scenario comprises selecting the transmission format partially based in part on quality of service requirements associated with the data within the data frame.

9. The method of claim 1, wherein the transmission scenario comprises selecting the transmission format based in part on threat information fed back from the receiver to the transmitter.

10. The method of claim 1, wherein the transmission scenario comprises selecting a parameter of the transmission format based in part on a random or pseudorandom number.

11. The method of claim 1, wherein the format information defines the transmission format in conjunction with a predefined format-encoding table.

12. The method of claim 1, wherein:
communicating the format information is performed by transmitting the format information on a first channel of the wireless communication link; and
transmitting each data frame is performed on a second channel of the wireless communication link.

13. The method of claim 1, further comprising encrypting the format information prior to transmission.

14. The method of claim 1, further comprising:
receiving the format information at the receiver via the wireless communication link;
determining a frame format of an incoming data frame at the receiver; and
receiving the incoming data frame at the receiver via the wireless communications link using the frame format of the incoming data frame.

15. The method of claim 14, further comprising decrypting the format information, wherein the format information has been encrypted by the transmitter.

16. The method of claim 14, wherein:
receiving the format information is performed on a first channel of the wireless communication link; and
receiving the incoming data frame is performed on a second channel of the wireless communication link.

17. The method of claim 1, wherein, communication format information from the transmitter to the receiver comprises using steganography to hide the format information.

18. A wireless transmission system providing transmitter-directed transmission security, comprising:
a framer having a data input and frame output and configured to form and output data frames using data received at the data input;
a selector coupled to the framer and configured to select a corresponding transmission format for each data frame based on a transmission security scenario; and
a transmitter coupled to the framer and the selector, the transmitter configured to transmit format information into a wireless channel that at least partially defines the transmission format and configured to transmit the data frames into the wireless channel using the corresponding transmission format.

19. The wireless transmission system of claim 18, wherein the selector comprises a random or pseudorandom number generator and the transmission security scenario comprises selecting a parameter of the transmission format based on a random or pseudorandom number.

20. The wireless transmission system of claim 19, wherein the selector randomly or pseudorandomly varies any of a transmission frequency, a transmission phase, a transmission amplitude, a spreading sequence, a modulation format, a data frame length, and combinations thereof.

21. The wireless transmission system of claim 18, wherein the transmitter comprises:
a first transmitter configured to transmit the format information; and
a second transmitter configured to transmit the data frames.

22. The wireless transmission system of claim 21, wherein the first transmitter comprises a cryptographic unit configured to encrypt the format information.

23. The wireless transmission system of claim 21, wherein the first transmitter comprises any of a frequency hopper, a direct sequence spreader, and combinations thereof.

24. A wireless reception system using transmitter-directed transmission security, comprising:
a first receiver configured to receive over a wireless communications link format information that at least partially defines a transmission format of data frames;

a decoder coupled to the first receiver and configured to use the format information to determine a frame format of the data frames; and a second receiver coupled to the decoder and configured to receive the data frames over the wireless communications link using the frame format determined by the decoder.

25. The wireless reception system of claim 24, wherein the decoder comprises a predefined encoding table that defines a relationship between format information and frame format.

26. The wireless reception system of claim 24, wherein the format information defines any of a transmission frequency, a transmission phase, a transmission amplitude, a spreading sequence, a modulation format, a data frame length, and combinations thereof.

27. The wireless reception system of claim 24, wherein the first receiver operates on a first channel of the wireless communication link and the second receiver operates on a second channel of the wireless communication link.

28. The wireless reception system of claim 24, wherein the decoder comprises a cryptographic unit configured to decrypt the format information.

29. The wireless reception system of claim 24, wherein:

the format information at least partially defines a plurality of different transmission formats of the data frames, each transmission format corresponds to a different frame format, the second receiver is further configured to receive one of the data frames in a first of the frame formats and another of the data frames in a second of the frame formats, and the first frame format is different than the second frame format.

* * * * *